Patented Dec. 29, 1931

1,839,136

UNITED STATES PATENT OFFICE

FERNANDO SOMOZA VIVAS, OF BRONXVILLE, NEW YORK, ASSIGNOR TO INTERNATIONAL FIREPROOF PRODUCTS CORPORATION, OF NEW YORK, N. Y., A CORPORATION OF DELAWARE

COMPOSITION AND PROCESS FOR FIREPROOFING CELLULOSE MATERIAL

No Drawing.   Application filed November 14, 1929.   Serial No. 407,281.

The invention relates to fireproofing cellulosic material as wallboard, paper, wood or the like.

It is an object of the invention to provide a process of fireproofing cellulosic material without substantially increasing its weight.

It is a further object of the invention to provide a process of fireproofing material of felted cellulosic fibres without so clogging the spaces between the fibres as to destroy the heat insulating qualities of the finished product.

It is a further object of the invention to provide a process for fireproofing cellulosic material which is relatively dense, as wood, or where the spaces between the fibres are reduced by pressure as calendered paper utilizing a material acting as a filler and which will not materially increase the weight of the product.

It is a further object of the invention to provide a composition of matter for use in the process comprising a combined binder or filler and fireproofing agents.

Other objects of the invention will appear from the following description of illustrative steps of the process and of materials to be used therein, disclosing illustrative embodiments of the invention.

To achieve the objects of the invention an alcohol, glycerine and dextrine are combined to provide what is designated in the description and claims as an alco-glycero-dextrine compound or solution, and this compound is combined with an ammonium compound, a borate and a magnesium compound to provide the fireproofing and binding or filling agent. Said agent is combined with water to provide a solution with which the material to be treated is impregnated.

The combination as a fireproofing agent of an ammonium compound, a borate and a magnesium compound provides an agent having fireproofing qualities at temperatures from the lowest point of combustion to the highest temperatures that will be met and because of the low specific gravity of magnesium the fireproofing agent will be lighter than the material treated and therefore the treated material when dry will be little, if any, heavier than the same material in untreated condition. The treated material will not be hygroscopic.

To prepare the alco-glycero-dextrine portion of the composition of matter provided by the invention, desirable quantities of the ingredients as given are combined as follows: Substantially forty parts of starch are boiled with substantially sixty parts of glycerine until a transparent mass results. While still hot substantially one hundred parts of either methyl, ethyl alcohol or denatured ethyl alcohol are added to and stirred with the mass with the result of cooling the mixture.

At present prices ammonium borate is too expensive for use in the process commercially hence it is preferred to provide the ammonium and borate elements in other forms. As an illustrative embodiment of the invention, the magnesium element may be used in the form of magnesium chloride or sulphate. The borate element in the form of boric acid and the ammonium element as ammonium chloride. A representative formula found desirable is as follows:

1 pound 8 ounces $MgCl_2$
4 ounces boric acid
4 ounces $NH_4Cl_2$ combined with 1.6 ounces of the alco-glycero-dextrine solution and water to make a solution with a specific gravity of about 18° Bé. at about 105° F. for use.

In treating wood or already manufactured paper or wallboard in accordance with the process, the material is impregnated with the described solution and then dried. In the case of materials like wallboard or paper, the excess of the solution is preferably squeezed out as by passing the materials between rollers before drying.

In applying the process of the invention during the manufacture of sheets of felted cellulosic fibres as wallboard or paper, the pulp is prepared and digested in the usual manner and the solution described is substituted for water in the beater to dilute the fibres for feed to the sheet-forming machine. In the latter case, for economic reasons it is important to save all liquid separated from the sheet in the machine and return the same to the beaters in lieu of fresh solution. By this practice any fibres passing through with the liquid are also conserved.

Paper, wallboard, or the like, prepared by the process described, may in accordance with my invention be made water-repellant by spraying the substantially finished sheet upon one or both surfaces with melted stearic acid. The thus applied material will react with the material with which the sheet is impregnated as described to form stearates upon and near the surface of the sheet, leaving the interior of the sheet in a porous condition. Common tallow or any other substance combinable with the impregnant to produce stearates may be used as an equivalent of stearic acid.

Minor changes in the steps of the process or in the quantities of ingredients used may be made within the scope of the following claims without departing from the spirit of the invention.

I claim:

1. The process of manufacturing fireproof wallboard, paper or the like, which comprises beating the pulp with the necessary quantity of an aqueous solution of the following materials in substantially the named quantities, i. e., 1 pound 8 ounces magnesium chloride
  4 ounces boric acid
  4 ounces ammonium chloride
  1. 6 ounces alco-glycero-dextrine solution and water to provide a solution having a specific gravity of substantially 18° Bé. at a temperature of substantially 100° F. and producing a sheet of material from the thus treated pulp in a usual manner.

2. The process of manufacturing fireproof wallboard, paper or the like, in which to the steps of claim 2 is added the step of impregnating a surface of the sheet with melted stearic acid.

3. A sheet of material comprising matted cellulose fibers containing a binder prepared by boiling starch in glycerine and adding alcohol to the product.

4. A sheet of flame resistant material comprising matted cellulose fibers intermixed with a binder prepared by boiling starch in glycerine and adding alcohol, and with magnesium and ammonium chlorides and a borate.

5. A sheet of flame and water resistant material comprising matted cellulose fibers intermixed with a binder prepared by boiling starch in glycerine and adding alcohol and with magnesium and ammonium chlorides and a borate, a surface of the sheet impregnated with stearic acid.

6. The process of manufacturing wallboard, paper or the like which comprises preparing a binder by boiling starch in glycerine. adding alcohol, beating pulp material with an aqueous solution of the thus prepared binder and forming a sheet of material from the thus prepared stock.

7. The process of manufacturing flame resistant wallboard, paper or the like which comprises preparing a binder by boiling starch in glycerine and adding alcohol, adding water and magnesium and ammonium chlorides and a borate, beating a pulp with the thus prepared solution and forming a sheet of material from the thus prepared stock.

8. The process of manufacturing flame resistant wallboard, paper or the like which comprises preparing a binder by boiling starch in glycerine and adding alcohol, adding water and magnesium and ammonium chlorides and boric acid, beating a pulp with the thus prepared solution and forming a sheet of material from the thus prepared stock.

9. The process of manufacturing flame resistant wallboard, paper or the like which comprises preparing a binder by boiling starch in glycerine and adding alcohol, adding water and magnesium and ammonium chlorides and a borate, beating a pulp with the thus prepared solution, forming a sheet of material from the thus prepared stock and applying melted stearic acid to a surface of the sheet as formed.

FERNANDO SOMOZA VIVAS.